(12) United States Patent
Cho et al.

(10) Patent No.: US 8,939,747 B2
(45) Date of Patent: Jan. 27, 2015

(54) INJECTION MOLD

(75) Inventors: Jin Hyun Cho, Seoul (KR); Jin Sub Kim, Seoul (KR); Jong Won Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/315,008

(22) Filed: Dec. 8, 2011

(65) Prior Publication Data

US 2012/0148699 A1 Jun. 14, 2012

(30) Foreign Application Priority Data

Dec. 10, 2010 (KR) ........................ 10-2010-0126246

(51) Int. Cl.
*B29C 45/73* (2006.01)
(52) U.S. Cl.
CPC .............. *B29C 45/73* (2013.01); *B29C 45/7312* (2013.01); *B29C 2045/7368* (2013.01)
USPC ........................................................ 425/143
(58) Field of Classification Search
CPC .... B29C 45/73; B29C 45/7312; B29C 45/78; B29C 2045/7393
USPC ........................................................ 425/143
See application file for complete search history.

(56) References Cited

U.S. PATENT DOCUMENTS

2008/0054527 A1   3/2008   Kang
2008/0303194 A1*  12/2008  Anbarasu et al. ............. 264/403

FOREIGN PATENT DOCUMENTS

| KR | 10-2006-0011764 A | 2/2006 |
| KR | 10-0701229 B1 | 3/2007 |
| KR | 10-2008-0023523 A | 3/2008 |
| KR | 10-2010-0053777 A | 5/2010 |
| KR | 10-0986393 B1 | 10/2010 |

OTHER PUBLICATIONS

Communication issued Jul. 20, 2012 by the International Searching Authority in counterpart International Application No. PCT/KR2011/009055.

* cited by examiner

*Primary Examiner* — Yogendra Gupta
*Assistant Examiner* — Alison Hindenlang
(74) *Attorney, Agent, or Firm* — Sughrue Mion, PLLC

(57) ABSTRACT

An injection mold includes a first mold part provided with a first mold surface and a second mold part provided with a second mold surface to form a cavity together with the first mold surface. Cooling channels along which a cooling fluid flows are provided in at least one of the first mold part and the second mold part, and a heat generating layer which receives power and then generates heat is disposed on the inner surfaces of the cooling channels and serves as a heater.

9 Claims, 6 Drawing Sheets

INJECTION MOLD

CROSS-REFERENCE TO RELATED APPLICATION

This application claims the priority from Korean Patent Application No. 2010-0126246, filed in the Korean Intellectual Property Office on Dec. 10, 2010, the disclosure of which is incorporated in its entirety herein by reference.

BACKGROUND

1. Field

Exemplary embodiments relate to an injection mold provided with cooling channels to guide a cooling fluid.

2. Description of the Related Art

In general, an injection mold is used to manufacture a resin product having a shape corresponding to a cavity of the mold by injecting molten resin into the mold.

Such an injection mold includes a first mold part and a second mold part connected to each other to form a cavity having a shape corresponding to the shape of the product to be manufactured, and is used to manufacture a resin product having a shape corresponding to the cavity by injecting the molten resin into the cavity using an injection device and then cooling and solidifying the molten resin within the cavity.

Further, a heater applying heat to the molten resin within the cavity to uniformly solidify the molten resin and cooling channels guiding a cooling fluid to adjust a cooling speed of the molten resin are provided at the injection mold.

SUMMARY

Exemplary embodiments relate to an injection mold having a compact structure.

Additional aspects will be set forth in part in the description which follows and, in part, will be obvious from the description, or may be learned by practice of the exemplary embodiments.

An aspect of an exemplary embodiment of an injection mold includes a first mold part provided with a first mold surface and a second mold part provided with a second mold surface to form a cavity together with the first mold surface, wherein cooling channels along which a cooling fluid flows are provided in at least one of the first mold part and the second mold part, and a heat generating layer which receives power and then generates heat is disposed on the inner surfaces of the cooling channels.

The injection mold may further include an insulating layer made of an electrically insulating material and disposed on the outer surface of the heat generating layer.

The heat generating layer may be restrictively formed at a partial region of the inner surface of each of the cooling channels which is located close to the cavity.

The injection mold may further include pipes, each of which is provided with a cooling path formed therein, the heat generating layer may be formed on the outer surfaces of the pipes, and the heat generating layer may be disposed on the inner surfaces of the cooling channels by installing the pipes within the cooling channels.

The injection mold may further include support members, each of which has an arc-shaped cross-section, the heat generating layer may be formed on the outer surfaces of the support members, and the heat generating layer may be disposed on the inner surfaces of the cooling channels by installing the support members within the cooling channels.

In accordance with another aspect of an exemplary embodiment, an injection mold includes a first mold part provided with a first mold surface, a second mold part provided with a second mold surface to form a cavity together with the first mold surface, and pipes installed in at least one of the first mold part and the second mold part, each of the pipes being provided with a cooling path formed therein to guide a cooling fluid, wherein a heat generating layer which receives power and then generates heat is disposed on the outer surfaces of the pipes.

BRIEF DESCRIPTION OF THE DRAWINGS

These and/or other aspects will be more apparent and more readily appreciated from the following description of the embodiments, taken in conjunction with the accompanying drawings of which.

DETAILED DESCRIPTION

Figure 1:
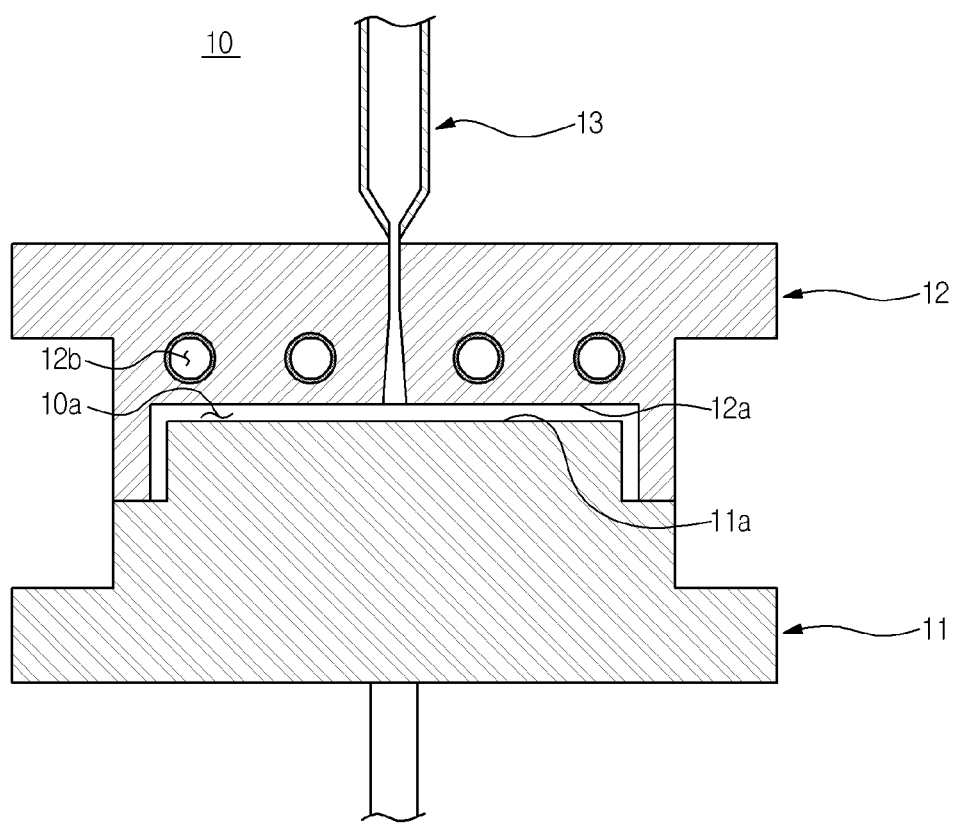
FIG. 1 is a cross-sectional view schematically illustrating an injection mold in accordance with one embodiment.

Reference will now be made in detail to the exemplary embodiments, examples of which are illustrated in the accompanying drawings, wherein like reference numerals refer to like elements throughout.

Hereinafter, an injection mold in accordance with one embodiment will be described in more detail with reference to the accompanying drawings.

As shown in FIG. 1, an injection mold 10 in accordance with this embodiment includes a first mold part 11 provided with a first mold surface 11a, a second mold part 12 connected to the first mole part 11 and provided with a second mold surface 12a to form a cavity 10a together with the first mold surface 11a, and an injection device 13 to inject molten resin into the cavity 10a.

Figure 2:
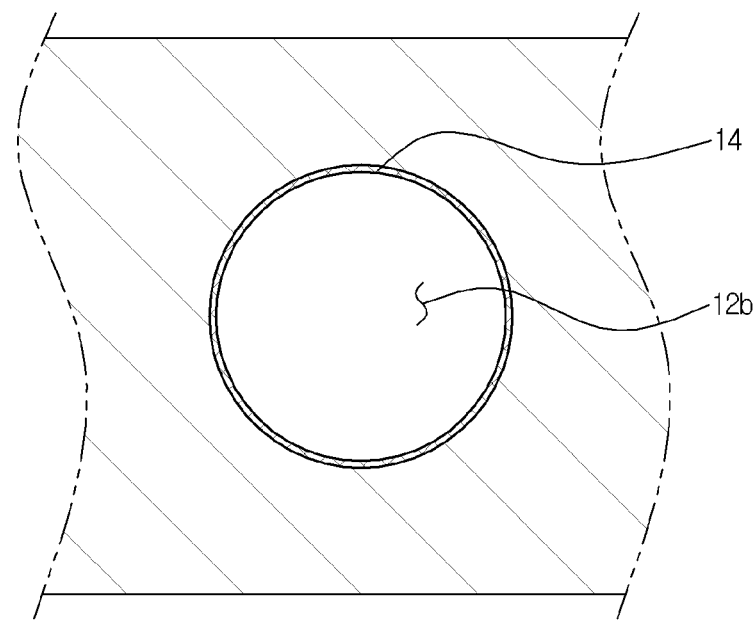
FIG. 2 is a cross-sectional view illustrating the configuration of a cooling channel applied to the injection mold in accordance with the embodiment.

Further, cooling channels 12b guiding a cooling fluid to cool the injection mold 10 are provided in the injection mold 10. A heat generating layer 14 which receives power and then heats the injection mold 10 is provided on the inner surface of each of the cooling channels 12b, as shown in FIG. 2. The cooling fluid is supplied through the cooling channels 12b to cool the injection mold 10, and power is supplied to the heat generating layer 14 and then the heat generating layer 14 heats the injection mold 10, thereby adjusting the inner temperature of the cavity 10a.

When the heat generating layer 14 is formed on the inner surface of each of the cooling channels 12b, as described above, cooling and heating of the injection mold 10 are achieved at the same position, and thus a space in which a heater is installed is omitted, compared to a conventional injection mold separately requiring a space in which a heater is installed and a space in which cooling channels are formed.

Therefore, the injection mold 10 according to the exemplary embodiment may have a compact structure.

The heat generating layer 14 is formed of a material, such as a carbon nano-tube, graphite or indium oxide. The heat generating layer 14 may be formed on the inner surfaces of the cooling channels 12b through various methods, such as spray coating or deposition using such a material. A power supply is connected to both ends of the heat generating layer 14 and thus the heat generating layer 14 functions as a heater.

Figure 3:
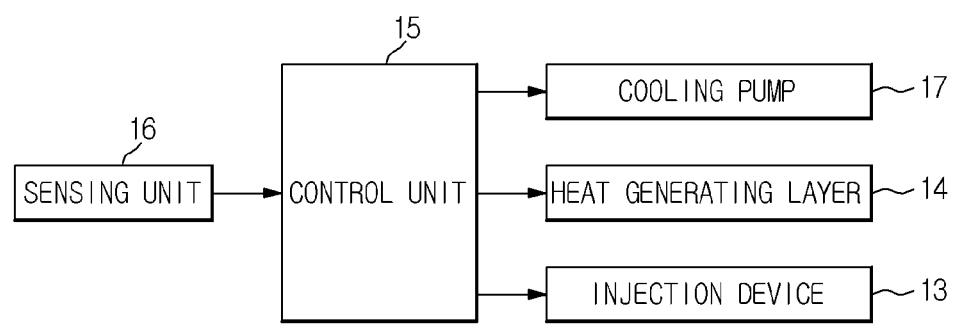
FIG. 3 is a control block diagram of the injection mold in accordance with the embodiment.

Further, the injection mold 10, as shown in FIG. 3, includes a control unit 15 to control operation of the injection mold 10, a temperature sensing unit 16 to sense the temperature of the cavity 10a of the injection mold 10, and a cooling pump 17 to supply the cooling fluid to the cooling channels 12b.

Herein, control and operation of the above injection mold in accordance with one embodiment will be described.

The control unit 15 applies power to the heat generating layer 14 so as to heat the injection mold 10. When the temperature sensing unit 16 judges that the temperature of the injection mold 10 has reached a designated temperature, the control unit 15 cuts off power transmitted to the heat generating layer 14 and controls the injection device 13 so as to inject the molten resin into the cavity 10a. After injection of the molten resin has been completed, the control unit 15 controls the cooling pump 17 so as to supply the cooling fluid to the cooling channels 12b. The injection mold 10 and the molten resin in the cavity 10a are cooled by the cooling fluid supplied to the cooling channels 12b, and thus the molten resin is solidified, thereby manufacturing a product having a shape corresponding to the cavity 10a.

In this embodiment, heating through the heat generating layer 14 is started when the inner temperature of the cavity 10a reaches about 70° C., and if the injection mold 10 is heated for about 26 seconds through the heat generating layer 14, the inner temperature of the cavity 10a rises to 100° C. When the temperature sensing unit 16 senses that the inner temperature of the cavity 10a has reached 100° C., the control unit 15 cuts off power transmitted to the heat generating layer 14 and then the molten resin is injected into the cavity 10a. Even after power transmitted to the heat generating layer 14 is cut off, the inner temperature of the cavity 10a temporarily rises from 100° C. to 108° C. by latent heat and the molten resin injected into the cavity 10a and then drops due to natural cooling, and it takes about 9 seconds to inject the molten resin into the cavity 10a. After injection of the molten resin has been completed, cooling of the injection mold 10 through the cooling fluid is carried out for about 42 seconds and thus the inner temperature of the cavity 10a drops to about 70° C. and the molten resin within the cavity 10a is solidified, thereby completing a product.

Figure 4:
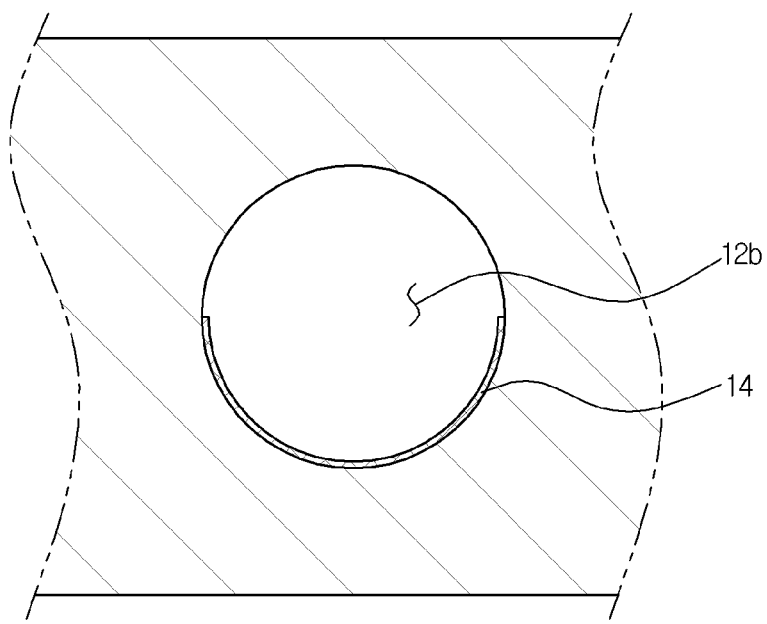
FIG. 4 is a cross-sectional view illustrating the configuration of a cooling channel applied to an injection mold in accordance with another embodiment.

Although this embodiment illustrates the heat generating layer 14 as being formed on the entirety of the inner surface of the cooling channel 12b, formation of the heat generating layer 14 is not limited thereto. That is, in accordance with another embodiment shown in FIG. 4, the heat generating layer 14 may be restrictively formed only at a portion of the inner surface of the cooling channel 12b which is located close to the cavity 10a. If the heat generating layer 14 is formed at a portion of the inner surface of the cooling channel 12b in such a manner, heat generated from the heat generating layer 14 may be effectively transmitted to the cavity 10a, thus increasing heat efficiency.

This embodiment illustrates the heat generating layer 14 as being directly formed on the inner surface of the cooling channel 12b, and, when the size of the injection mold 10 increases to a designated level or more and thus the length of the cooling channel 12b increases, formation of the heat generating layer 14 directly on the inner surface of the cooling channel 12b is difficult.

Figure 5:
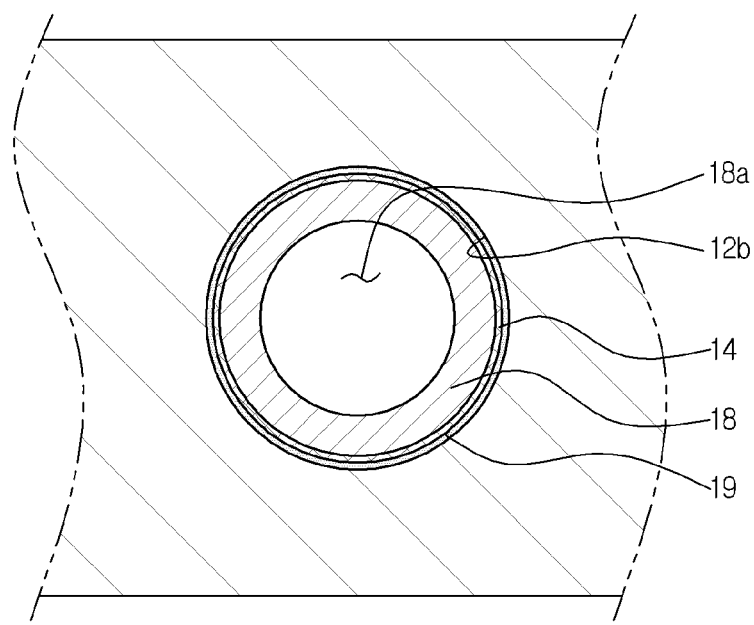
FIG. 5 is a cross-sectional view illustrating the configuration of a cooling channel applied to an injection mold in accordance with another embodiment.

Therefore, in accordance with another embodiment shown in FIG. 5, after a heat generating layer 14 is formed on the outer surface of a pipe 18 having a ring-shaped cross-section and provided with a cooling path 18a formed therein such that a cooling fluid flows along the cooling path 18a, the pipe 18 provided with the outer surface on which the heat generating layer 14 is formed is disposed within the cooling channel 12b, thereby allowing the heat generating layer 14 to be disposed on the inner surface of the cooling channel 12b. That is, after the heat generating layer 14 having a shape and a diameter corresponding to those of the inner surface of the cooling channel 12b is formed on the outer surface of the pipe 18, the pipe 18 is installed within the cooling channel 12b, thereby allowing the heat generating layer 14 to be disposed on the inner surface of the cooling channel 12b.

If the heat generating layer 14 is disposed on the inner surface of the cooling channel 12b through the pipe 18 in such a manner, the heat generating layer 14 may be disposed on the inner surface of the cooling channel 12b regardless of the length of the cooling channel 12b.

Further, since power is applied to the heat generating layer 14 to generate heat, as described above, the injection mold 10 includes an insulating layer 19 to prevent power transmitted to the heat generating layer 14 from being transmitted to the injection mold 10. The insulating layer 19 is formed by winding a film made of an electrically insulating material, such as resin, on the outer surface of the heat generating layer 14 and fixing the film, thus insulating the heat generating layer 14 and the inner surface of the cooling channel 12b from each other.

Figure 6:
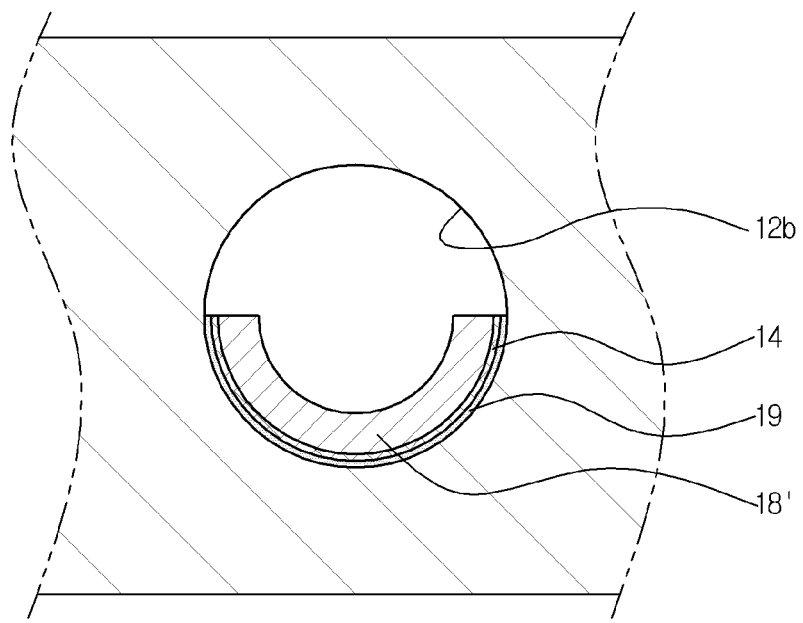
FIG. 6 is a cross-sectional view illustrating the configuration of a cooling channel applied to an injection mold in accordance with a further embodiment.

Although this embodiment illustrates the heat generating layer 14 as being disposed on the inner surface of the cooling channel 12b through the pipe 18 having a ring-shaped cross-section, formation of the heat generating layer 14 is not limited thereto. In accordance with a further embodiment shown in FIG. 6, the heat generating layer 14 may be disposed on the inner surface of the cooling channel 12b through a support member 18' having an arc-shaped cross-section corresponding to the inner surface of the cooling channel 12b. That is, after the heat generating layer 14 having an arc-shaped cross-section is formed on the outer surface of the support member 18' having the arc-shaped cross-section, the support member 18' provided with the outer surface on which the heat generating layer 14 is formed is installed with the cooling channel 12b, thereby allowing the heat generating layer 14 to be disposed on the inner surface of the cooling channel 12b. Here, the support member 18' provided with the outer surface on which the heat generating layer 14 is formed is disposed at a portion of the inner surface of the cooling channel 12b which is located close to the cavity 10a. If the heat generating layer 14 is disposed on the inner surface of the cooling channel 12b through the support member 18' in such a manner, heat generated from the heat generating layer 14 may be effectively transmitted to the cavity 10a as well as the heat generating layer 14 may be disposed on the inner surface of the cooling channel 12b regardless of the length of the cooling channel 12b.

Although the above-described embodiments illustrate the cooling channels 12b and the heat generating layer 14 as being formed only on the second mold part 12, formation of the cooling channels 12b and the heat generating layer 14 is not limited thereto. That is, cooling channels and a heating generating layer may be formed only on the first mold part 11, or may be formed on both the first mold part 11 and the second mold part 12.

As is apparent from the above description, an injection mold in accordance with one embodiment allows a heat generating layer disposed on cooling channels to serve as a heater and does not require a space in which the heater is installed, thus providing a compact structure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An injection mold comprising:
   a first mold part provided with a first mold surface;
   a second mold part provided with a second mold surface to form a cavity together with the first mold surface;
   cooling channels, for a cooling fluid to flow therein, provided in at least one of the first mold part and the second mold part; and
   a heat generating layer, which receives power and generates heat, disposed on inner surfaces of each of the cooling channels, wherein the heat generating layer is formed only at a region of the inner surface of each of the cooling channels which is located closest to the cavity.

2. The injection mold according to claim 1, further comprising an insulating layer made of an electrically insulating material and disposed on an outer surface of the heat generating layer.

3. The injection mold according to claim 1, further comprising pipes within the cooling channels, each of said pipes provided with a cooling path formed therein, the heat generating layer disposed between outer surfaces of the pipes and the inner surfaces of the cooling channels.

4. The injection mold according to claim 1, further comprising support members within the cooling channels, each of said support members having an arc-shaped cross-section, the heat generating layer disposed between outer surfaces of the support members and the inner surfaces of the cooling channels.

5. An injection mold comprising:
   a first mold part provided with a first mold surface;
   a second mold part provided with a second mold surface to form a cavity together with the first mold surface;
   pipes installed in at least one of the first mold part and the second mold part, each of the pipes being provided with a cooling path formed therein to guide a cooling fluid; and
   a heat generating layer which receives power and generates heat disposed directly on outer surfaces of each of the pipes, wherein the heat generating layer is formed only at a region of the outer surfaces of pipes which is located closest to the cavity.

6. The injection mold according to claim 5, further comprising cooling channels provided in the at least one of the first mold part and the second mold part, so that the pipes are disposed within the cooling channels.

7. The injection mold according to claim 5, further comprising an insulating layer formed on an outer surface of the heat generating layer to insulate the cooling path.

8. An injection mold, comprising:
   a cavity defined by a first mold part and a second mold part;
   an injection device for injecting resin into the cavity;
   cooling channels disposed in at least one of the first mold part and the second mold part;
   a heat generating layer disposed within the cooling channels, wherein the heat generating layer is formed only at a region within each of the cooling channels which is located closest to the cavity;
   a temperature sensing unit to sense the temperature of the cavity;
   a cooling pump to supply cooling fluid to the cooling channels; and
   a control unit that powers the heat generating layer to heat the injection mold, cuts off power to the heat generating layer if the temperature sensing unit senses that a predetermined temperature has been reached for the injection mold, controls the injection device to inject molten resin into the cavity, and controls the cooling pump to supply the cooling fluid to the cooling channels.

9. The injection mold according to claim 8, further comprising:
   an insulating layer disposed between an outer surface of the heat generating layer and an inner surface of the cooling channels; and
   a pipe disposed between an inner surface of the heat generating layer and a cooling path through which cooling fluid flows.

\* \* \* \* \*